> 3,108,608
> LAWN MOWER WASHER ASSEMBLY
> Edward A. Mahowald, 612 Main St., Farmington, Minn.
> Filed July 20, 1961, Ser. No. 125,479
> 5 Claims. (Cl. 134—198)

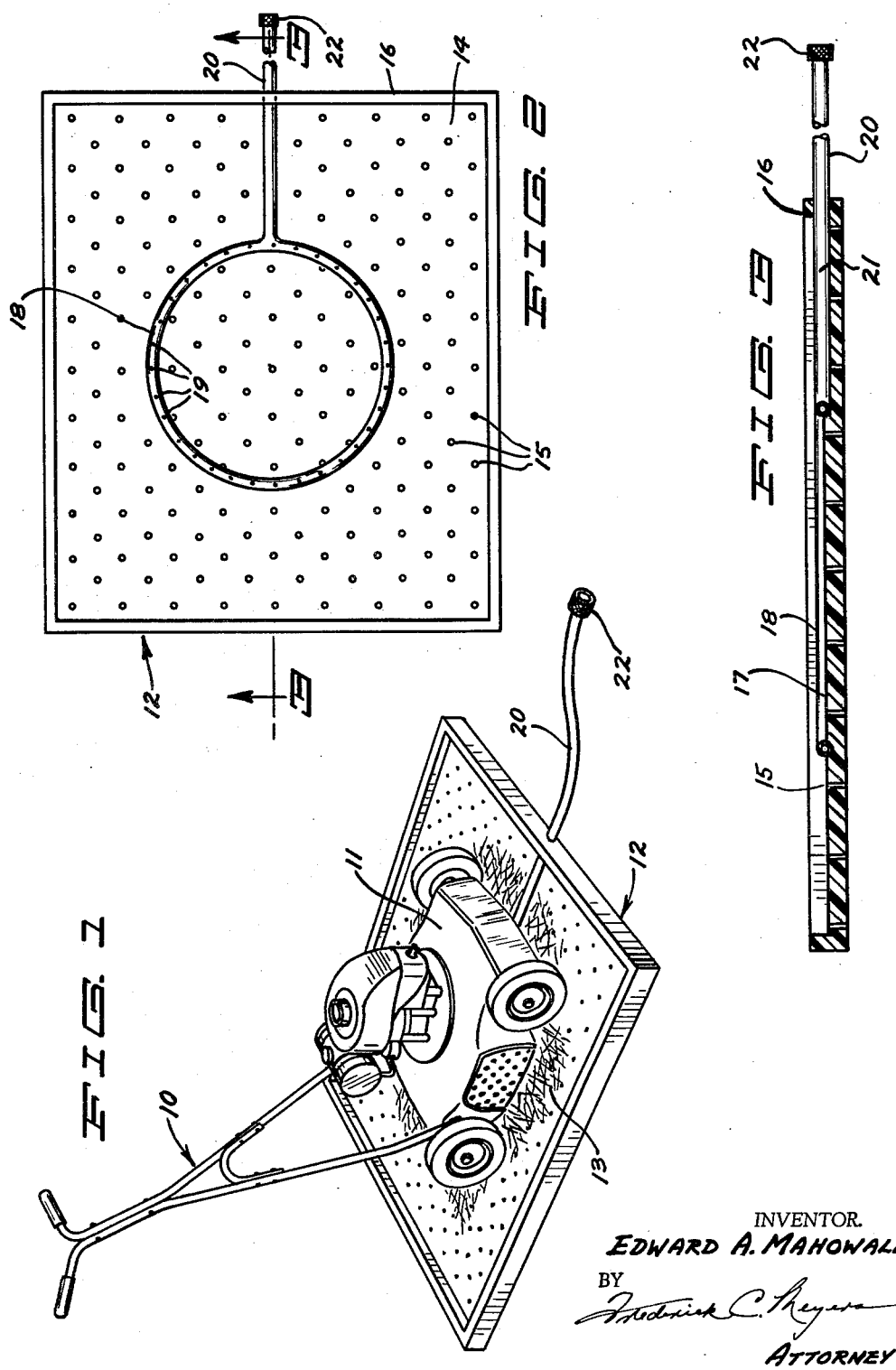

This invention relates to the cleaning of rotary lawn mowers and more particularly to a rotary lawn mower washing assemblage.

Very often during a lawn mowing operation the lawn mowers of the rotary type become plugged and clogged with newly cut grass or else become sluggish in operation because of the discharging ducts becoming fouled with the grass cuttings. When so clogged up, the lawn mower must necessarily be cleaned, such operation usually being in the form of removing the grass cuttings with a stick or with the hand. In order to clean a lawn mower, the lawn mower housing is usually tipped at a vertical angle with the ground or is even tipped entirely upside down. Since, by far, most rotary lawn mowers are of the power type, this means that when tipped upside down, the gasoline and oil will escape their containers and foul the engine mechanism. Such cleaning means is, of course, impractical for larger operator-riding type mowers because of size and weight.

It is a general object of this invention to provide a washing unit for a rotary-type lawn mower which eliminates substantially all of the manual labor mentioned above and in a manner wherein the lawn mower is not necessarily tipped or otherwise oriented for cumbersome working by the operator for cleaning purposes.

It is another object of this invention to provide a simple and self-contained unitary assemblage unit for flushing grass cuttings from the conventional rotary-type lawn mower housings.

A further object is to provide the above type assemblage with an efficient and inexpensive means for collecting and retaining the grass cuttings when washed from the lawn mower housing while allowing free drainage of the water.

A still further object of this invention is to provide a washing assemblage for a rotary lawn mower which may be made light weight and portable thus lending itself to easy relocation.

And a further object of this invention is to provide a lawn mower washing assemblage which is substantially flat so that a lawn mower may be easily run upon it in preparation to the washing operation and likewise easily removed from the assemblage by simply rolling the lawn mower off.

These and other objects and advantages of this invention will more fully appear from the following description, made in connection with the accompanying drawing, wherein like reference characters refer to the same or similar parts throughout the several views and in which:

FIGURE 1 shows the lawn mower washing assemblage with a rotary-type lawn mower positioned thereon as the two would appear during the washing operation;

FIGURE 2 is a top view of the washing assemblage; and

FIGURE 3 is a cross-sectional view of FIGURE 2 taken on line 3—3.

Referring again now to FIGURE 1, the rotary lawn mower represented at 10 having a housing 11 is shown positioned on the lawn mower washing assembly referred to generally as 12. Number 13 represents grass cuttings which have been dislodged from the lawn mower housing 11 during the washing operation.

FIGURE 2 represents a top view of the washing assemblage 12. The assemblage is comprised of a perforated mat 14 which may be of a flexible material such as plastic or rubber. The mat 14 is thick enough, as seen in FIGURE 3, to withstand the weight of a lawn mower without being substantially punctured by the lawn mower wheels yet being thin enough to require little weight and thus lend itself to easy carrying.

Spaced about the surface of the mat 14 and extending completely therethrough are a plurality of apertures 15. These apertures are of sufficient size to allow free water drainage yet of small enough size to prevent grass cuttings from also draining therethrough.

Surrounding the perforate mat 14 is a raised peripheral edge margin 16. This margin extends only a slight amount above the mat surface 17, as may be seen in FIGURE 3. The peripheral edge 16 is high enough to prevent water and grass cuttings from draining thereover, yet short enough to allow the lawn mower to be rolled upon the mat preparatory to the washing operation. The peripheral edge margin 16 is integrally formed with the perforate mat 14.

Centrally located within the peripheral edge margin 16 is substantially circular spray tube 18 which is also integrally formed with the mat 14. By integrally forming the spray tube 18 with the mat 14, the chance of the tube being caught in the blade of the rotary lawn mower is eliminated during the washing operation, as will become apparent subsequently. The circular portion of the spray tube is supplied with a plurality of orifices 19 on the uppermost surface whereby to allow a substantially upwardly directed water spray when water under pressure is supplied at the tube inlet 20. Such a pressurized water source may be a garden hose which is connected to an ordinary house supply of water. As may be seen from FIGURE 3, the tube inlet 19 is positioned exteriorly of the peripheral edge margin 16 and the water passage 21 extends through the edge margin from the hose coupling 22 to the spray tube 18.

In the use and operation of this lawn mower washing assemblage invention, the assemblage 12 is laid upon a substantially flat portion of ground or sidewalk, and the tube inlet is then connected via the coupling 21 to a conventional garden hose. The lawn mower then is simply rolled onto the mat and centrally positioned over the spray tube 18 after which it is started and allowed to run. The water pressure is then turned on to provide a spray from the orifices. The lawn mower, while running at a governed speed, will cause greater agitation of the water spray under the housing. Thus there is a more positive and efficient cleaning operation than if the lawn mower blade were stationary.

As the flushing operation continues, the grass cuttings will become dislodged from the housing and allowed to drain free therefrom and fall upon the mat. The water, which is sprayed upon the housing, drips therefrom and carries with it the grass cuttings. The water subsequently is allowed to freely seep through the apertures 15. With the apertures of small enough size, the grass cuttings will be retained in the mat until the entire washing operation is completed.

When the washing operation is done, the lawn mower may be simply rolled off of the mat and allowed to drain dry. With the water pressure disconnected from the tube inlet, the water used to flush the mower housing will all drain through the perforation apertures thereby leaving substantially all of the grass cuttings on the mat surface 17. It now becomes apparent that the operator need merely scoop up the grass cuttings with his hands or a brush and otherwise clean the mat free of the grass.

As mentioned above, the lawn mower, to aid the washing operation, may be started and run during the washing operation. With the lawn mower blade whirling in its cutting action position, it is apparent that with the spray tube 18 integrally formed with the mat 14, or at least fixedly secured thereto, that there is little chance of the spray tube 18 becoming entangled in the mower cutting blade and thus becoming damaged. Another reason for having the spray tube 18 integrally formed with the mat 14 is that there is then only one unitary washing apparatus which needs to be carried from location to location. Thus, parts are not easily lost which often occurs when assemblage components are separable.

Thus it is seen that an inexpensive and efficient means for cleaning a rotary-type lawn mower of grass cuttings has been provided wherein the grass cuttings and the washing water are easily separable. The assemblage is extremely simple to operate and is, of course, of such size and weight that it is easily movable from storage to the location of the washing operation.

It will, of course, be understood that various changes may be made in the form, details, arrangements and proportions of the parts without departing from the scope of the invention as set forth in the appended claims.

What is claimed is:

1. A portable lawn mower washing assemblage for a rotary lawn mower comprising, a generally flat mat of substantially larger size than a rotary lawn mower housing having a downwardly facing ground contacting surface and an upwardly facing cut grass retaining surface, a plurality of water seepage apertures lying in spaced relation and extending through said mat and said surfaces so as to permit passage of water but substantially to prevent cut grass from passing therethrough, a spray tube adapted for conveying water and having a plurality of orifices for the discharge of water spray in an upwardly direction, said tube being secured to said mat intermediate the peripheral edges thereof, whereby a lawn mower when placed on said mat in overlying relation to said tube may be readily and easily flushed by water spray when pressurized water is fed to said tube.

2. A portable lawn mower washing assemblage for a rotary lawn mower comprising, a flexible and generally flat mat of larger size than a rotary lawn mower housing having a downwardly facing ground contacting surface and an upwardly facing cut grass retaining surface, said mat and surfaces being perforate for water seepage while preventing the passage of cut grass therethrough, a raised peripheral edge margin about said mat for retaining grass cuttings and water during the washing operation, a spray tube adapted for conveyance of water and having a plurality of orifices located on the upper side thereof for discharge of water spray in an upwardly direction, said tube being secured to said mat within said peripheral edge margin, whereby a lawn mower when placed on said mat in overlying relation to said tube may be readily and easily flushed by water spray when pressurized water is fed to said tube by way of said tube inlet.

3. A portable lawn mower washing assemblage for a rotary lawn mower comprising, a flexible and generally flat mat of larger size than a rotary lawn mower housing having a downwardly facing ground contacting surface and an upwardly facing cut grass retaining surface, said mat and said surfaces being perforate for water seepage while preventing the passage of cut grass therethrough, a raised peripheral edge margin about said mat, a substantially circular spray tube adapted for conveyance of water and having a plurality of orifices located on the upper side thereof for discharge of water spray in an upwardly direction, said tube being integrally formed with said mat within the periphery thereof, whereby a rotary lawn mower when placed on said mat in overlying relation to said tube may be readily and easily flushed by water spray when pressurized water is fed to said tube by way of said tube inlet.

4. A lawn mower washing assemblage for a rotary lawn mower comprising, a flexible mat of substantially larger size than a rotary lawn mower housing having a perforate surface for water seepage therethrough, a raised peripheral edge margin for retaining grass cuttings and water during the washing operation, a substantially circular spray tube adapted for conveyance of water and having a plurality of orifices located on the upper side thereof for discharge of water spray in an upwardly direction, said tube being integrally formed with said mat within the periphery thereof, and having a tube inlet positioned exteriorly of said peripheral margin, whereby a lawn mower when placed on said mat in overlying relation to said tube may be readily and easily flushed by water spray when pressurized water is fed to said tube by way of said tube inlet.

5. A lawn mower washing assemblage as set forth in claim 4 wherein said mat and said integrally formed tube are of a flexible plastic material.

References Cited in the file of this patent

UNITED STATES PATENTS

| | | |
|---|---|---|
| 154,759 | Lautenbach | Sept. 8, 1874 |
| 683,111 | Fisher | Sept. 24, 1901 |
| 1,487,062 | Hohl | Mar. 18, 1924 |
| 1,758,767 | Taggert | May 13, 1930 |
| 2,936,563 | Blume | May 17, 1960 |